United States Patent
Li et al.

(10) Patent No.: US 11,326,469 B2
(45) Date of Patent: May 10, 2022

(54) CMCS WITH LUMINESCENCE ENVIRONMENTAL BARRIER COATINGS

(71) Applicant: Rolls-Royce Corporation, Indianapolis, IN (US)

(72) Inventors: Li Li, Carmel, IN (US); Jun Shi, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 83 days.

(21) Appl. No.: 16/887,294

(22) Filed: May 29, 2020

(65) Prior Publication Data
US 2021/0372293 A1    Dec. 2, 2021

(51) Int. Cl.
*F01D 21/00* (2006.01)
*F01D 21/14* (2006.01)
(Continued)

(52) U.S. Cl.
CPC .......... *F01D 21/003* (2013.01); *F01D 5/284* (2013.01); *F01D 5/288* (2013.01); *F01D 11/122* (2013.01); *F01D 21/14* (2013.01); *F01D 25/005* (2013.01); *G01B 11/0658* (2013.01); *G01N 21/64* (2013.01); *F05D 2230/90* (2013.01); *F05D 2260/80* (2013.01); *F05D 2260/83* (2013.01); *F05D 2300/15* (2013.01)

(58) Field of Classification Search
CPC .. G01N 21/64–6489; G01N 2021/6406–6497; G01N 2291/02854; G01B 5/066; G01B 11/0658; C09D 11/322; C09D 11/324; C09D 11/326; C09D 11/40; C09D 11/50; F01D 5/288; F05D 2230/90
See application file for complete search history.

(56) References Cited

U.S. PATENT DOCUMENTS 2,102,784 A * 12/1937 Bridges ............... B60C 11/24
                                                                                    264/246
3,578,055 A *  5/1971 French ................ B60C 11/24
                                                                                    152/154.2
(Continued)

FOREIGN PATENT DOCUMENTS

CA       2686332 A1     5/2010
CN    101858872 A *   10/2010  ............ G01K 1/143
(Continued)

OTHER PUBLICATIONS

Matejicek et al., "Alternative Methods for Determination of Composition and Porosity in Abradable Materials," Materials Characterization, Elsevier, vol. 57, No. 1, Jul. 1, 2006, pp. 17-29.
(Continued)

*Primary Examiner* — Topaz L. Elliott
(74) *Attorney, Agent, or Firm* — Shumaker & Sieffert, P.A.

(57) ABSTRACT

An article includes a substrate defining a surface, a bond coat on the surface of the substrate, a coating layer on the bond coat, and a wear indicator. The coating layer includes at least one of an environmental barrier coating (EBC) or an abradable coating. The wear indicator disposed in a first region of the coating layer and includes at least one chromophore dopant and a material of the EBC or the abradable coating. The wear indicator is configured to indicate wear of the coating layer.

19 Claims, 6 Drawing Sheets

(51) Int. Cl.
*F01D 25/00* (2006.01)
*F01D 5/28* (2006.01)
*G01N 21/64* (2006.01)
*F01D 11/12* (2006.01)
*G01B 11/06* (2006.01)

(56) References Cited

U.S. PATENT DOCUMENTS

| | | | | |
|---|---|---|---|---|
| 3,671,139 | A | * | 6/1972 | Plowman ................ F01D 5/282 416/61 |
| 4,774,150 | A | * | 9/1988 | Amano ..................... C23C 4/02 116/200 |
| 4,922,113 | A | | 5/1990 | Melancon |
| 5,187,542 | A | | 2/1993 | Madzsar |
| 5,270,116 | A | | 12/1993 | Melancon et al. |
| 6,644,917 | B2 | | 11/2003 | Zhao et al. |
| 6,682,665 | B2 | | 1/2004 | Watson |
| 6,730,918 | B2 | | 5/2004 | Srivastava et al. |
| 6,733,908 | B1 | * | 5/2004 | Lee ....................... C04B 35/185 428/702 |
| 6,943,357 | B2 | | 9/2005 | Srivastava et al. |
| 7,221,445 | B2 | | 5/2007 | Earthman et al. |
| 7,231,817 | B2 | | 6/2007 | Smed et al. |
| 7,270,890 | B2 | | 9/2007 | Sabol et al. |
| 7,510,776 | B2 | | 3/2009 | Choy et al. |
| 7,619,728 | B2 | | 11/2009 | Ogburn et al. |
| 7,858,952 | B2 | * | 12/2010 | Feist .................. C09K 11/7794 250/459.1 |
| 8,012,374 | B2 | | 9/2011 | van Ooij et al. |
| 8,124,252 | B2 | * | 2/2012 | Cybulsky .............. C23C 28/042 428/701 |
| 8,173,266 | B2 | | 5/2012 | Choy et al. |
| 9,556,743 | B2 | | 1/2017 | Chamberlain et al. |
| 10,060,099 | B2 | * | 8/2018 | Serrurier ............... E02F 9/2883 |
| 10,435,793 | B2 | | 10/2019 | Feist et al. |
| 10,550,711 | B2 | | 2/2020 | Chamberlain et al. |
| 2005/0037231 | A1 | * | 2/2005 | Jones .................... C09K 11/00 428/690 |
| 2005/0241148 | A1 | * | 11/2005 | Vance ................... C04B 41/009 29/889.2 |
| 2007/0015283 | A1 | | 1/2007 | Choy et al. |
| 2007/0134518 | A1 | * | 6/2007 | Feist ..................... C09K 11/02 428/701 |
| 2008/0136324 | A1 | * | 6/2008 | Bast ........................ C23C 30/00 313/506 |
| 2009/0162533 | A1 | * | 6/2009 | Kirby .................... F01D 5/288 427/8 |
| 2009/0162561 | A1 | * | 6/2009 | Kirby .................... C23C 30/00 427/452 |
| 2010/0129636 | A1 | * | 5/2010 | Cybulsky ............... C23C 28/42 428/310.5 |
| 2010/0154422 | A1 | | 6/2010 | Kirby et al. |
| 2011/0203281 | A1 | * | 8/2011 | Sarrafi-Nour .......... C04B 41/87 60/722 |
| 2011/0281110 | A1 | * | 11/2011 | Sambasivan ........ C04B 41/5022 428/336 |
| 2011/0299987 | A1 | | 12/2011 | Billotey et al. |
| 2012/0285226 | A1 | | 11/2012 | Laurer et al. |
| 2013/0084163 | A1 | | 4/2013 | Wiebe |
| 2013/0266420 | A1 | | 10/2013 | Kidane et al. |
| 2015/0345308 | A1 | * | 12/2015 | Roberts, Jr. ............ F01D 11/08 416/212 A |
| 2016/0003092 | A1 | | 1/2016 | Chamberlain et al. |
| 2016/0061050 | A1 | * | 3/2016 | Keenan ................ F01D 11/122 415/118 |

FOREIGN PATENT DOCUMENTS

| | | | | |
|---|---|---|---|---|
| CN | 106507800 | A | * 10/2012 | ............ C03C 1/008 |
| EP | 1657536 | A1 | 5/2006 | |
| EP | 1777731 | A1 | 4/2007 | |
| GB | 2439389 | A | * 12/2007 | ............ G01K 1/143 |
| GB | 2455850 | A | 6/2009 | |
| JP | 2008308374 | A | 12/2008 | |
| JP | 2009133240 | A | 6/2009 | |
| JP | 2021017860 | A | * 2/2021 | ............ G01K 1/143 |
| WO | 9924812 | A1 | 5/1999 | |
| WO | 2015126476 | A2 | 8/2015 | |

OTHER PUBLICATIONS

Nychka, "Damage quantification in TBCs by photo-stimulated luminescence spectroscopy", Surface and Coatings Technology 146-147 (2001) 110-116, 7 pgs. (Applicant points out, in accordance with MPEP 609.04(a), that the year of publication, 2001, is sufficiently earlier than the effective U.S filing date, so that the particular month of publication is not in issue.).

Gentleman et al. "Concepts for luminescence sensing of thermal barrier coatings", Surface & Coatings Technology 188-189 (2004) 93-100, Oct. 12, 2004. 8 pgs.

Cannas et al. "Nanocrystalline luminescent Eu3+-doped Y2SiO5 prepared by sol-gel technique", Optical Materials 27 (2005) 1506-1510, Feb. 17, 2005, 5 pgs.

Gentleman et al., "Luminescence sensing of temperature in pyrochlore zirconate materials for thermal barrier coatings", Surface & Coatings Technology 200 (2005) 1264-1269, Sep. 9, 2005, 6 pgs.

Clarke et al. "Luminescence sensing of temperature in thermal barrier coatings", Surface & Coatings Technology 202 (2007) 681-687, Jun. 2, 2007, 7 pgs.

Chambers et al. "Luminescence thermometry for environmental barrier coating materials", Surface & Coatings Technology 203 (2008) 461-465, Jul. 31, 2008, 5 pgs.

Chambers et al. "Doped Oxides for High-Temperature Luminescence and Lifetime Thermometry", Annu. Rev. Mater. Res. 2009. 39:325-59, Downloaded on Apr. 26, 2017, 37 pgs.

Liddell et al. "X-ray Diffraction Data for Yttrium Silicates", Br. Ceram. Trans. J., 85, 17-22, 1986, 7 pgs. (Applicant points out, in accordance with MPEP 609.04(a), that the year of publication, 1986, is sufficiently earlier than the effective U.S. filing date, so that the particular month of publication is not in issue.).

Prosecution history for U.S. Appl. No. 14/789,676 dated Jan. 22, 2016 through Nov. 25, 2016, 48 pgs.

Prosecution history for U.S. Appl. No. 15/381,825 dated Oct. 5, 2018 through Sep. 19, 2019, 52 pgs.

* cited by examiner

CMCS WITH LUMINESCENCE ENVIRONMENTAL BARRIER COATINGS

TECHNICAL FIELD

The disclosure relates to environmental barrier coatings.

BACKGROUND

Ceramic or ceramic matrix composite (CMC) materials may be useful in a variety of contexts where mechanical and thermal properties are important. Ceramic or CMC materials may be resistant to high temperatures, but some ceramic or CMC materials may react with some elements and compounds present in the operating environment of high temperature mechanical systems, such as water vapor. Reaction with water vapor may result in the recession of the ceramic or CMC material. These reactions may damage the ceramic or CMC material and alter mechanical properties of the ceramic or CMC material, which may reduce the useful lifetime of the component. Thus, in some examples, a ceramic or CMC material may be coated with an environmental barrier coating, which may reduce exposure of the substrate to elements and/or compounds present in the operating environment of high temperature mechanical systems.

SUMMARY

The disclosure describes coating systems that include at least one chromophore dopant disposed in a selected region of the coating and defining a wear indicator that is configured to indicate a wear state of the coating system. For example, the system coating may include a wear indicator disposed at a predetermined depth of the coating system. The wear indicator includes a chromophore dopant and a material of the coating system, such as a material of an EBC or an abradable coating of the coating system. The chromophore dopant may emit a selected luminescence in response to a selected incident radiation. By detecting the luminance of the chromophore dopant, a wear state, such as an average thickness of the coating, a number of coating layers worn through, or wear variation across a selected area, may be estimated or determined.

In some examples, the coating system may include at least one distinct layer that includes a chromophore dopant. The chromophore dopant may be the same as or different than the chromophore dopant of the wear indicator. The at least one distinct layer may be disposed at a predetermined depth of the coating. The at least one distinct layer may, together with or separate from the wear indicator, enable a wear state of the coating system to be estimated or determined. In some examples, detecting a luminance of the chromophores of both the wear indicator and the at least one distinct layer may enable more accurate determination of a wear state of the coating system.

In order to minimize losses in gas turbine efficiency, proper clearance should be maintained between a gas turbine blade and a surrounding track or shroud during the entire life of the component. The abradable coating described herein includes at least one feature that may provide a simple visual indicator detectable during an on-wing inspection. This visual indicator may provide a simple and accurate indication of the ability of the abradable coating to provide proper sealing with the gas turbine blade, resulting in the system meeting efficiency targets.

In some examples, the disclosure describes an article including a substrate defining a surface, a bond coat on the surface of the substrate, a coating layer on the bond coat, and a chromophore dopant. The coating layer may include at least one of an EBC or an abradable coating. The chromophore dopant may be disposed in a first region of the coating layer and define a wear indicator. The wear indicator includes a material of the EBC or the abradable coating and the chromophore dopant. The wear indicator may be configured to indicate wear of the coating layer.

In some examples, the disclosure describes a coating system of a gas turbine engine component. The coating system may include a bond coat on a surface of a ceramic matrix composite defining the gas turbine engine component, a coating layer on the bond coat, and a wear indicator disposed in a first region of the coating layer. The coating layer may include at least one of an environmental barrier coating (EBC) or an abradable coating. The wear indicator may include a material of the EBC or the abradable coating and a chromophore dopant. The wear indicator may be configured to indicate wear of the coating layer.

In some examples, the disclosure describes a method of forming a coating system that includes depositing a bond coat on a surface of a substrate. the method also includes depositing a wear indicator on the bond coat. The wear indicator may include a material of at least one of an EBC or an abradable coating and a chromophore dopant. The method also includes depositing on at least a portion of the bond coat and the wear indicator a coating layer comprising the material of the EBC or the abradable coating.

The details of one or more examples are set forth in the accompanying drawings and the description below. Other features, objects, and advantages will be apparent from the description and drawings, and from the claims.

DETAILED DESCRIPTION

Figure 1:
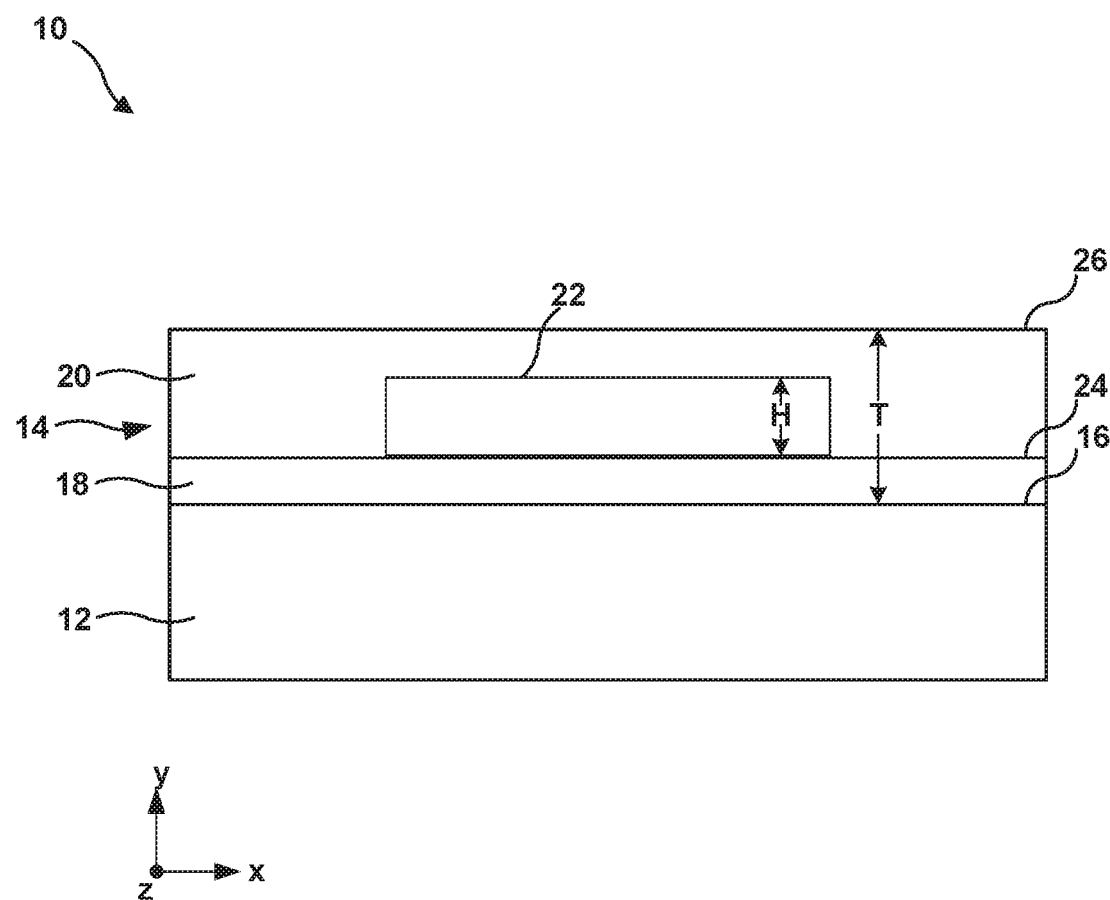
FIG. 1 is a conceptual diagram illustrating a cross-sectional view of an example article that includes a substrate and a coating system that includes a wear indicator.

The present disclosure describes coating systems that include at least one chromophore dopant disposed in a selected region of the coating and defining a wear indicator that is configured to indicate a wear state of the coating system. In some examples, the coating system may be formed on a ceramic or CMC substrate, a component of a high temperature mechanical system, such as a gas turbine engine blade, blade track, or blade shroud. As one example, during operation of a gas turbine engine, the blades, blade track, or blade shroud is exposed to combustions gases. Elements and compounds present in the combustion gases may react with or degrade a portion of the coating system (e.g., an environmental barrier coating (EBC) of the coating system). Additionally, or alternatively, rubbing of a gas turbine engine blade against the coating system, erosion by the gases flowing past the coating system and contact with debris in the gases, or both, may remove portions of the coating system (e.g., an abradable coating).

Degradation and/or removal of portions of the coating system may cause the coating to wear. The at least one chromophore dopant disposed in a selected region of the coating and defining a wear indicator may facilitate inspection of a wear state of the coating system. In some examples, inspection of the wear state may be performed visually or using a spectrometer to detect a luminescence emitted by the chromophore dopant in response to a selected incident radiation, such as radiation that includes visible wavelengths, UV wavelengths, or both. Additionally or alternatively, X-ray inspection or ultrasonic techniques may be used to detect a depth of the wear indicator below an outer surface of the abradable coating.

By incorporating the at least one chromophore dopant disposed in a selected region of the coating and defining a wear indicator that facilitates inspection of a wear state of the coating system, the disclosed coating systems may be used to determine a remaining useable life of the coating system and/or component including the coating system. For example, the average thickness of the coating system, wear through one or more layers of the coating, or variation in wear of a selected area of the coating system may be determined. In some examples, this may facilitate at least one of determination of a size, depth, or both of damage to the coating system, and facilitate the removal and repair of the coating system to maintain selected physical properties of the coating system. Maintaining selected physical properties of the coating system may improve useable life of the component, such as by reducing environmental degradation of the coating system or the component, or maintain selected component tolerances, such as clearances between an abradable coating and a blade tip to maintain a selected efficiency level of a gas turbine engine.

Although the description describes coating systems including EBCs and/or abradable coatings, in other examples, the subject matter described herein may be applied to coatings of other types, such as abrasive coatings, thermal barrier coatings, self-lubricating coatings, or the like. The layer structure and compositions may differ for these different types of coatings, but layers including at least one chromophore dopant disposed in a selected region of the coating and defining a wear indicator may be used in these other coating systems.

FIG. 1 is a conceptual diagram illustrating a cross-sectional view of an example article 10 that includes a substrate 12 and coating system 14 that includes wear indicator 22. Substrate 12 defines a surface 16. Coating system 14 may include a bond coat 18 and a coating layer 20. In some examples, bond coat 18 is disposed directly on surface 16 of substrate 12. Coating layer 20 may be disposed directly on a surface 24 of bond coat 18. Coating system 14 (e.g., coating layer 20) may define an outer surface 26. Coating layer 20 may include at least one of an environmental barrier coating (EBC) or an abradable coating. In the example illustrated in FIG. 1, wear indicator 22 is disposed on surface 24 of bond coat 18 and surrounded by coating layer 20.

Article 10 may be a component of a high temperature mechanical system. For example, article 10 may be a blade track, a blade shroud, an airfoil, a blade, a vane, a combustion chamber liner, an engine hot section component, or the like, of a gas turbine engine.

Substrate 12 may include a ceramic or a ceramic matrix composite (CMC). For example, substrate 12 may include a silicon-containing ceramic or CMC having a silicon-containing ceramic, such $SiO_2$, silicon carbide (SiC), or silicon nitride ($Si_3N_4$); $Al_2O_3$; aluminosilicate (e.g., $Al_2SiO_5$); or the like. In examples in which substrate 12 includes a ceramic, the ceramic may be substantially homogeneous.

In examples in which substrate 12 includes a CMC, substrate 12 may include a matrix material and a reinforcement material. The matrix material may include a ceramic material, such as, for example, SiC, $Si_3N_4$, $Al_2O_3$, aluminosilicate, $SiO_2$, or the like. The reinforcement material may include discontinuous whiskers, platelets, or particulates; or continuous monofilament or multifilament weave. In some examples, the composition of the reinforcement material is the same as the composition of the matrix material. For example, a matrix material comprising silicon carbide may surround a reinforcement material comprising silicon carbide whiskers. In other examples, the reinforcement material includes a different composition than the composition of the matrix material, such as aluminosilicate fibers in an alumina matrix, or the like. One composition of a substrate 12 that includes a CMC includes a reinforcement material comprising silicon carbide continuous fibers embedded in a matrix material comprising silicon carbide. In some examples, substrate 12 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

In some examples, substrate 12 may include a metal alloy, a metal superalloy, a metal alloy that includes silicon. For example, substrate 12 may include a metal alloy that includes Si, such as a molybdenum-silicon alloy (e.g., $MoSi_2$) or a niobium-silicon alloy (e.g., $NbSi_2$).

As shown in FIG. 1, article 10 includes bond coat 18 on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, i.e., there are no intermediate layers or coatings.

Bond coat 18 may improve adhesion between substrate 12 and the layer overlying bond coat 18 (e.g., coating layer 20). Bond coat 18 may include any useful material that improves adhesion between substrate 12 and an overlying layer. In some examples, bond coat 18 may act as a protective layer that decreases migration of an oxidizing agent into substrate 12 by reacting with an oxidizing species to form a protective thermally grown oxide (TGO) layer. Bond coat 18 may have any suitable thickness. In some examples, a thickness of bond coat 18 may be within a range from about 25.4 micrometers (μm, about 0.001 inch) to about 254 μm (about 0.01 inch). In some examples, article 10 may not include a bond coat 18, and coating layer 20 may be formed directly on substrate 12.

In examples in which substrate 12 is a ceramic or CMC, bond coat 14 may a silicon-based bond coat, and may include silicon metal (e.g., elemental silicon; Si), a silicon-containing alloy, a silicon-containing ceramic, or another silicon-containing compound. In some examples, the presence of Si in bond coat 14 may promote adherence between bond coat 14 and substrate 12 and between bond coat 14 and coating layer 20, such as, for example, when substrate 12, coating layer 20, or both, includes silicon metal or a silicon-containing alloy or compound.

In examples in which substrate 12 is a superalloy, bond coat 14 may include an alloy, such as an MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-Ni$_3$Al nickel aluminide alloy (either unmodified or modified by Pt, Cr, Hf, Zr, Y, Si, and combination thereof), or the like.

Bond coat 18 may be formed on substrate 12 using, for example, thermal spraying, plasma spraying, physical vapor deposition (PVD), electron beam physical vapor deposition (EB-PVD), directed vapor deposition (DVD), chemical vapor deposition (CVD), cathodic arc deposition slurry process deposition, sol-gel process deposition, electrophoretic deposition, or the like.

Coating layer 20 includes one or more layers of material configured to protect substrate 12 during operation of article 10. In some examples, coating layer 20 may include an EBC. The EBC may be configured to reduce or substantially prevent attack of bond coat 18 and/or substrate 12 by chemical species present in the operating environment of article 10, e.g., the operating environment of a high temperature mechanical component. The operating environment of article 10 may include, for example, the intake gas, combustion gas, or exhaust gas of a gas turbine engine. In some examples, the EBC may include a material that is resistant to oxidation or water vapor attack.

The EBC may include, for example, at least one of mullite; a glass ceramic such as barium strontium aluminosilicate (BaO—SrO—Al$_2$O$_3$-2SiO$_2$; BSAS), calcium aluminosilicate (CaAl$_2$Si$_2$O$_8$; CAS), cordierite (magnesium aluminosilicate), and lithium aluminosilicate; or one or more rare earth silicates (silicates of Lu, Yb, Tm, Er, Ho, Dy, Tb, Gd, Eu, Sm, Pm, Nd, Pr, Ce, La, Y, or Sc). The rare earth silicate may be a rare earth mono-silicate (RE$_2$SiO$_5$, where RE stands for "rare earth") or a rare earth di-silicate (RE$_2$Si$_2$O$_7$, where RE stands for "rare earth"). In some examples, a rare earth disilicate may have a coefficient of thermal expansion (CTE) that is close to substrate 12 and/or bond coat 18. For example, in examples where the EBC includes ytterbium disilicate (Yb$_2$Si$_2$O$_7$), bond coat 18 includes silicon (Si) metal, and substrate 12 includes silicon carbide (SiC), ytterbium disilicate may have a CTE of about $4.7 \times 10^{-6}$ C.$^{-1}$, while silicon and silicon carbide may each have a CTE of about $4.5 \times 10^{-6}$ C.$^{-1}$.

The EBC may be formed using any suitable technique, such as, for example, thermal spraying, CVD, PVD, EB-PVD, DVD; plasma spraying, or the like. In some examples, the EBC is formed as a substantially non-porous layer. In other examples, the EBC is formed as a layer that includes a plurality of cracks or pores. In some examples, the EBC may define a thickness, measured in a direction substantially normal to surface 16 of substrate 12 within a range from about 25.4 μm (about 0.001 inch) to about 508 μm (about 0.02 inch).

In some examples, coating layer 20 may include an abradable coating. The abradable coating may be selected to protect article 10, e.g., coating system 14, from physical damage, such as abrasion or impact against other components or debris. An abradable coating may be configured to be abraded, e.g., by a blade of a gas turbine engine, in order to form a relatively tight seal between article 10 and another component, such as, for example, a blade of a gas turbine engine. In some examples, abradability may include a disposition to break into relatively small pieces when exposed to a sufficient physical force. Abradability may be influenced by the material characteristics of the material(s) in the abradable coating, such as fracture toughness and fracture mechanism (e.g., brittle fracture), as well as the porosity of the abradable coating. In some examples, the abradable coating may exhibit thermal shock resistance and high-temperature capability.

The abradable coating may include any suitable material. For example, the abradable coating may include at least one of a rare-earth oxide, a rare-earth silicate, an aluminosilicate, or an alkaline earth aluminosilicate. In some examples, the abradable coating may include at least one rare-earth disilicate, mullite, BSAS, BAS, SAS, at least one rare earth oxide, at least one rare earth monosilicate, or combinations thereof. Additionally, or alternatively, the abradable coating may include any of the compositions described herein with respect to the EBC.

The wear indicator 22 may be configured to emit a selected luminescence in response to selected incident radiation that is distinct from a luminescence or other visual characteristic of coating layer 20. For example, the wear indicator may include a chromophore dopant that is not present in coating layer 20. The chromophore dopant may be selected to emit the selected luminance in response to the selected incident radiation. The incident radiation may include any suitable wavelength range of radiation, such as, for example, wavelength of radiation within at least one of a visible light spectrum or an ultra-violet light spectrum.

In some examples, the chromophore dopant may include a trivalent rare earth metal. For example, the chromophore dopant may include at least one of Ce$^{3+}$, Pr$^{3+}$, Nd$^{3+}$, Pm$^{3+}$, Sm$^{3+}$, Eu$^{3+}$, Gd$^{3+}$, Tb$^{3+}$, Dy$^{3+}$, Ho$^{3+}$, Er$^{3+}$, Tm$^{3+}$, or Yb$^{3+}$.

In some examples, a rare earth (RE) chromophore dopant may be selected to form, e.g., with a constituent of a material of coating layer 20, at least one of a rare earth silicate or a rare earth disilicate. In some examples, a rare earth (RE) silicate may include, for example, a rare earth monosilicate having the chemical formula RE$_{1-x}$SiO$_5$:RE$^{3+}$x, where X is within a range from about 0.0005 to about 0.5. In some examples, a rare earth (RE) silicate may include, for example, a rare earth disilicate having the chemical formula RE$_{1-x}$Si$_2$O$_7$:RE$^{3+}$x, where X is within a range from about 0.0005 to about 0.5. For example, the rare earth silicate may include at least one of cerium monosilicate (Ce$_2$SiO$_5$), cerium disilicate (Ce$_2$Si$_2$O$_7$), praseodymium monosilicate (Pr$_2$SiO$_5$), praseodymium disilicate (Pr$_2$Si$_2$O$_7$), neodymium monosilicate (Nd$_2$SiO$_5$), neodymium disilicate (Nd$_2$Si$_2$O$_7$), promethium monosilicate (Pm$_2$SiO$_5$), promethium disilicate (Pm$_2$Si$_2$O$_7$), samarium monosilicate (Sm$_2$SiO$_5$), samarium disilicate (Sm$_2$Si$_2$O$_7$), europium monosilicate (Eu$_2$SiO$_5$), europium disilicate (Eu$_2$Si$_2$O$_7$), gadolinium monosilicate (Gd$_2$SiO$_5$), gadolinium disilicate (Gd$_2$Si$_2$O$_7$), terbium monosilicate (Tb$_2$SiO$_5$), terbium disilicate (Tb$_2$Si$_2$O$_7$), dysprosium monosilicate (Dy$_2$SiO$_5$), dysprosium disilicate (Dy$_2$Si$_2$O$_7$), holmium monosilicate (Ho$_2$SiO$_5$), holmium disilicate (Ho$_2$Si$_2$O$_7$), erbium monosilicate (Er$_2$SiO$_5$), erbium disilicate (Er$_2$Si$_2$O$_7$), thulium monosilicate ($Tm_2SiO_5$), thulium disilicate ($Tm_2Si_2O_7$), yttrium monosilicate ($Y_2SiO_5$), yttrium disilicate ($Y_2Si_2O_7$), ytterbium monosilicate ($Yb_2SiO_5$), or ytterbium disilicate ($Yb_2Si_2O_7$). In some examples, wear indicator 22 may include a disilicate and the at least one rare earth chromophore. For example, wear indicator 22 may include yttrium disilicate doped with the at least one rare earth chromophore.

In some examples, wear indicator 22 may luminesce, e.g., fluoresce, when exposed to a selected wavelength range of radiation. For example, the wear indicator 22 may include at least one of yttrium monosilicate ($Y_2SiO_5$), yttrium disilicate ($Y_2Si_2O_7$), ytterbium monosilicate ($Yb_2SiO_5$), or ytterbium disilicate ($Yb_2Si_2O_7$), all of which may fluoresce when exposed to UV radiation. In some examples, wear indicator 22 may possess a visual characteristic observable in the visible wavelengths that is different from a visual characteristic of a material of coating layer 20. For example, the observable color of the wear indicator 22 may be different than the observable color of a material of coating layer 20.

In some examples, wear indicator 22 may include a height H (e.g., a maximum height or an average height) that is less than a thickness of at least a portion of coating system 14 (or the layer of coating system 14 in which wear indicator 22 is located). For example, the wear indicator 22 may have height H that is less than thickness T of coating layer 20 (measured in the y-axis direction of FIG. 1, where orthogonal x-y-z axes are shown for ease of description only). In some examples, the wear indicator 22 may include a height H that is less than 1000 micrometers (e.g., between 1 micrometer and 1000 micrometer), such as less than about 100 micrometers (e.g., between 1 micrometer and 100 micrometer).

Wear indicator 22 may be located at a predetermined depth from outer surface 26 of coating system 14. For example, the predetermined depth may be a substantially consistent depth (e.g., within common tolerances of coating application technologies) from outer surface 26. When at least some of wear indicator 22 is exposed (e.g., observable) at a surface of coating system 14, e.g., due to degradation or removal of a portion of coating system 14, the remaining thickness of coating system 14 (e.g. coating layer 20) at that location may be determined based on at least one of a height H of wear indicator 22 or a thickness T of coating system 14 (or thickness of a layer of coating system 14, such as a thickness of coating layer 20). In some examples, this may facilitate at least one of determination of a remaining life of coating system 14, determination of a size and/or depth of damage to coating system 14, or removal and repair of coating system 14.

Wear indicator 22 may include any suitable shape. As illustrated in FIG. 1, wear indicator 22 may include a rectilinear column extending substantially perpendicular to surface 16 of substrate 12 (e.g., the y-direction). In other examples, wear indicator 22 may include other shapes, such as a cylindrical column. In some examples, a shape of wear indicator 22 may be configured to vary a surface profile (e.g., in the x-z plane) of wear indicator 22 as coating layer 20 wears. For example, wear indicator 22 may define a tapered column extending substantially perpendicular to surface 16 of substrate 12 (e.g., the y-direction). The shape of the tapered column may be rectilinear, a frustum, a pyramid, a cone, a truncated cone, or the like. The shape of the tapered column of wear indicator 22 may be configured to, in a first wear state, emit a first luminescence in response to a selected incident radiation. Additionally, the shape of the tapered column of wear indicator 22 may be configured to, in a second wear state, emit a second, different luminescence in response to the selected incident radiation. For example, a first surface profile of wear indicator 22 in the x-z plane at the first wear state may have a first area and a second surface profile of wear indicator 22 in the x-z plane at the second wear state may have a second, different area. The difference between the first area of the first surface profile and the second area of the second surface profile may result in, for example, a detectable difference in luminance, such as an intensity of luminance. In some examples, the intensity of luminance may be used to determine an amount of wear of coating system 14, e.g., a thickness of coating layer 20. In this way, the shape of wear indicator 22 may be selected to improve a precision of a determination of a wear state of coating system 14.

In some examples, coating system 14 may include a plurality of layers, such as two or more of an EBC, an abradable coating, abrasive coatings, thermal barrier coatings, self-lubricating coatings, or other materials used for coating high temperature mechanical system components. At least one of the layers may be an EBC layer or an abradable coating layer that includes a wear indicator.

Figure 2:
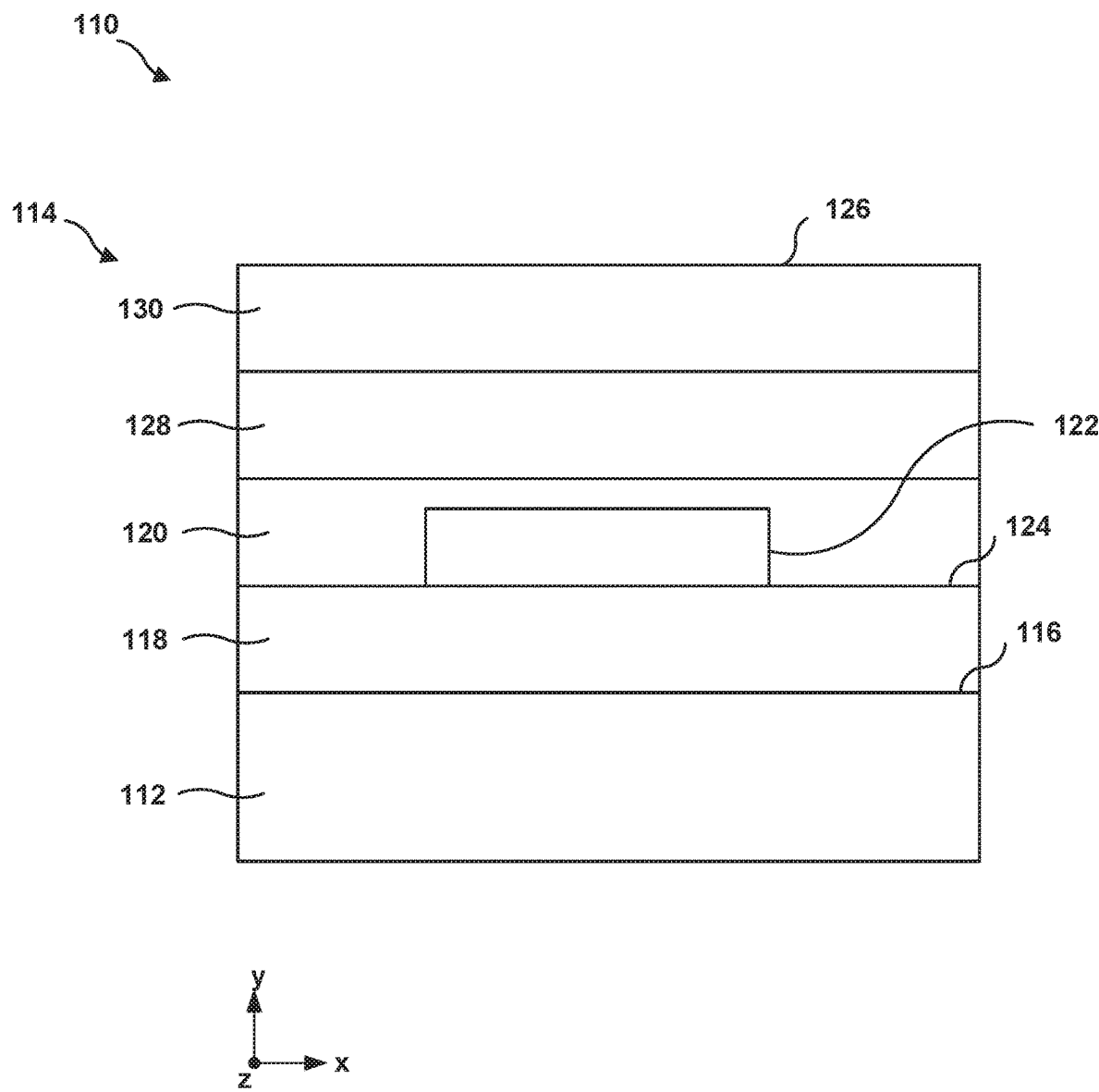
FIG. 2 is a conceptual cross-sectional diagram illustrating an example article that includes a coating system having a plurality of layers and a wear indicator.

FIG. 2 is a conceptual cross-sectional diagram illustrating an example article 110 that includes coating system 114 having a plurality of layers and a wear indicator 122. Article 110 may be the same as or substantially similar to article 10 described above in reference to FIG. 1, except for the differences described herein. For example, article 110 that includes a substrate 112, an optional bond coat 118 on a surface 116 of substrate 112, first EBC 120 on bond coat 118, a second EBC 128 on first EBC 120, and a third EBC 130 on second EBC 128. In the example illustrated in FIG. 2, EBC 120 includes a wear indicator 122.

Article 110 may include a bond coat 118 on substrate 112. In some examples, article 110 does not include bond coat 118. For example, first EBC 120 may be formed directly on substrate 112. Article 110 may not include bond coat 118 when the layer on substrate 112 (e.g., first EBC 120) and substrate 112 are sufficiently chemically and/or mechanically compatible. For example, in examples where first EBC 120 and substrate 112 adhere sufficiently strongly to each other, article 110 may not include bond coat 118. Additionally, in examples where the coefficients of thermal expansion of substrate 112 and first EBC 120 are sufficiently similar, article 110 may not include bond coat 118.

First EBC 120 may be the same as or substantially similar to coating layer 20 described above in reference to FIG. 1. For example, first EBC 120 may include an EBC as described above in reference to FIG. 1. Although described as an EBC, in other example, first EBC 120 may include an abradable coating, as described above, or another coating, such as a TBC or a second bond coat. Wear indicator 122 may be formed on bond coat 118 and substantially surrounded by first EBC 120.

In some examples, in addition to or as an alternative to wear indicator 122, first EBC 120 may include a chromophore dopant within a material of first EBC 120. The chromophore dopant may include at least one chromophore dopant described above in reference to FIG. 1. The chromophore dopant may be uniformly or nearly uniformly dispersed, e.g., within common tolerances of coating technologies, within first EBC 120. Alternatively, the chromophore may be dispersed within first EBC 120 to define a gradient of the chromophore dopant. For example, first EBC 120 may include a greater concentration of the chromophore dopant near bond coat 118 relative to other portions of first EBC 120 and a lesser concentration of the chromophore dopant near second EBC 128 relative to other portions of first EBC 120. In some examples, the gradient may be perpendicular relative to surface 124 of bond coat 118.

Second EBC 128 is disposed on first EBC 120. Second EBC 128 may be similar to or substantially the same (e.g., the same or nearly the same) as coating layer 20 described in reference to FIG. 1 or, in some examples, first EBC 120. In some examples, second EBC 128 may include a second chromophore dopant, e.g., in a similar manner as described above in reference first EBC 120. The second chromophore dopant of second EBC 128 may be different than the first chromophore dopant of first EBC 120. In this way, the chromophore dopant of first EBC 120 (e.g., the first coating layer) may be configured to indicate a first wear state of article 110. The second chromophore dopant of second EBC 128 (e.g., the second coating layer) may be configured to indicate a second wear state of article 110.

The second wear state may be less than the first wear state. For example, the second wear state may be indicative of degradation or removal of at least a portion of coating system 114 from outer surface 126 to at least a portion of second EBC 128. The first wear state may be indicative of degradation or removal of at least a portion of coating system 114 from outer surface 126 to at least a portion of first EBC 120. In this way, detecting one of the first wear state or the second wear state may be used to determine an average thickness of coating system 114, determine wear through one or more layers of coating system 114 (e.g., wear through layers overlying second EBC 128) and/or through second EBC 128, and/or determine a variation in wear of a selected area of coating system 114 (e.g., when both the first chromophore of first EBC 120 and the second chromophore of the second EBC 128 are detected in the selected area of coating system 114).

Third EBC 130 is disposed on second EBC 128. Third EBC 130 may be similar to or substantially the same (e.g., the same or nearly the same) as coating layer 20 described in reference to FIG. 1 or, in some examples, first EBC 120 and/or second EBC 128. In some examples, third EBC 130 may include a third chromophore dopant, e.g., in a similar manner as described above in reference first EBC 120. The third chromophore dopant of third EBC 130 may be different than the first chromophore dopant of first EBC 120 and/or second chromophore dopant of second EBC 128. In this way, the third chromophore dopant of third EBC 130 (e.g., the third coating layer) may be configured to indicate a third wear state of article 110.

The third wear state may be less than the second wear state. For example, the third wear state may be indicative of degradation or removal of at least a portion of coating system 114 from outer surface 126 to at least a portion of third EBC 130. In this way, detecting one of the first wear state, the second wear state, and/or the third wear state may be used to determine an average thickness of coating system 114, determine wear through one or more layers of coating system 114 (e.g., wear through layers overlying third EBC 130, through third EBC 130, and/or through second EBC 128), and/or determine a variation in wear of a selected area of coating system 114 (e.g., when any two of the first chromophore of first EBC 120, the second chromophore of the second EBC 128, or the third chromophore of the third EBC 130 are detected in the selected area of coating system 114).

Figure 3:
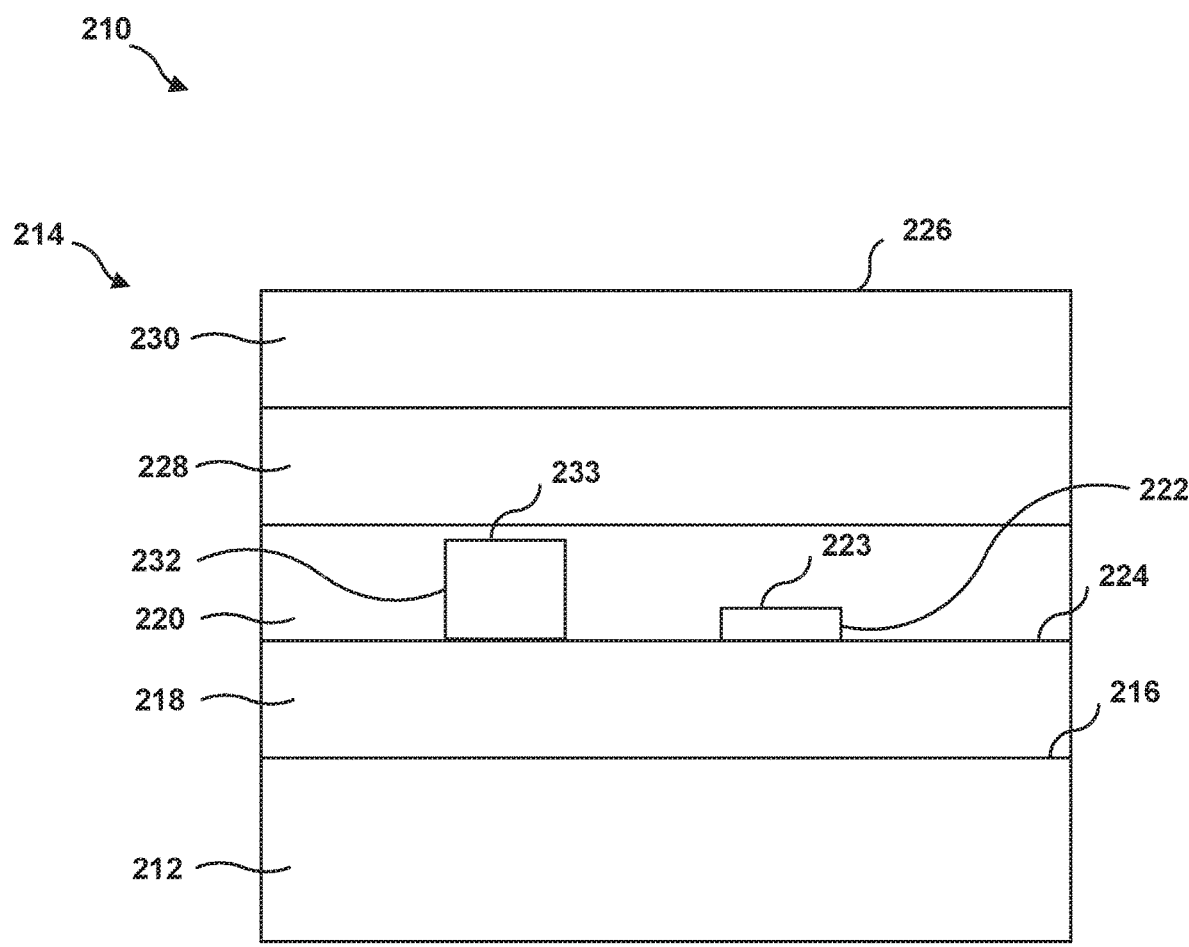
FIG. 3 is a conceptual cross-sectional diagram illustrating an example article that includes a coating system having a plurality of layers, a first wear indicator, and a second wear indicator.
Figure 3:
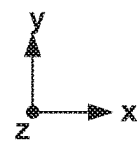

In some examples, rather than including a single wear indicator (or type of wear indicators) in a single layer of a coating system, a coating system may include multiple types of wear indicators in a single layer of a coating system or wear indicators (of a single type or multiple types) in multiple layers of a coating. FIG. 3 is a conceptual cross-sectional diagram illustrating example article 210 that includes coating system 214 having a plurality of layers, a first wear indicator 222, and a second wear indicator 223. Article 210 may be the same as or substantially similar to article 110 described above in reference to FIG. 2, except for the differences described herein. For example, article 210 includes a substrate 212, a bond coat 218, an first EBC 220, a second EBC 228, and a third EBC 230. In the example illustrated in FIG. 3, first EBC 220 includes first wear indicator 222 and second wear indicator 232. In other examples, coating system 214 may include wear indicators in other layers or may include additional wear indicators in the same or different layers.

In some examples, the composition of first wear indicator 222 may be the same as or substantially similar to the composition of second wear indicator 232. As coating system 214 wears, e.g., at least to surface 233 of wear indicator 232, a first intensity of a luminance emitted by second wear indicator 232 may be indicative of a first wear state of coating system 214. As coating system 214 wears further, e.g., at least to surface 223 of wear indicator 222, a second intensity of a luminance emitted by first wear indicator 222 and second wear indicator 232 may be indicative of a second wear state of coating system 214.

In some examples, the composition of first wear indicator 222 may be different than the composition of second wear indicator 232. As coating system 214 wears, e.g., at least to surface 233 of wear indicator 232, a first luminance (e.g., a first frequency of emitted radiation) emitted by second wear indicator 232 may be indicative of a first wear state of coating system 214. As coating system 214 wears further, e.g., at least to surface 223 of wear indicator 222, a second luminance (e.g., a second frequency of emitted radiation) emitted by first wear indicator 222 or a combination of first wear indicator 222 and second wear indicator 232 may be indicative of a second wear state of coating system 214.

Figure 4:
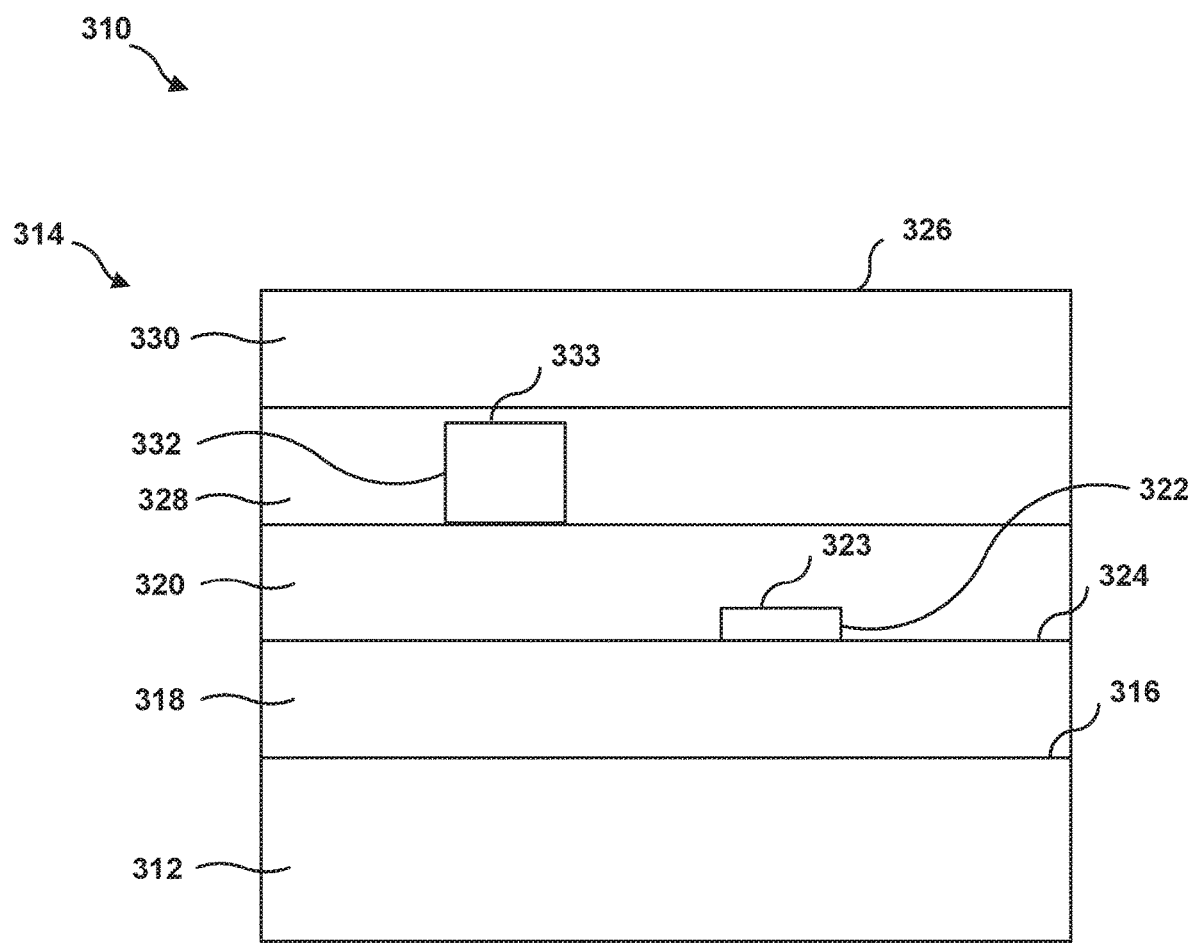
FIG. 4 is a conceptual cross-sectional diagram illustrating an example article that includes a coating system having a plurality of layers, a first wear indicator, and a second wear indicator.

In some examples, each of a plurality of wear indicators may be disposed in different layers of a coating system. FIG. 4 is a conceptual cross-sectional diagram illustrating example article 310 that includes coating system 314 having a plurality of layers, a first wear indicator 322, and a second wear indicator 323. Article 310 may be the same as or substantially similar to article 210 described above in reference to FIG. 3, except for the differences described herein. For example, article 310 includes a substrate 312, a bond coat 318, an first EBC 320, a second EBC 328, and a third EBC 330. In the example illustrated in FIG. 3, first EBC 320 includes first wear indicator 322 and second EBC 328 includes second wear indicator 332. In other examples, coating system 314 may include wear indicators in other layers or may include additional wear indicators in the same or different layers. First wear indicator 322 and second wear indicator 332 at multiple, different depths from outer surface 326 may facilitate more precise determination of the remaining thickness of coating system 314 compared to a coating system having only wear indicator(s) at a single, uniform depth.

In some examples, the composition of first wear indicator 322 may be the same as or substantially similar to the composition of second wear indicator 332. As coating system 314 wears, e.g., at least to surface 333 of wear indicator 232, a first luminance (e.g., frequency) emitted by second wear indicator 332 may be indicative of a first wear state of coating system 314. As coating system 314 wears further, e.g., at least to surface 323 of wear indicator 322, the first luminance (e.g., frequency) emitted by first wear indicator 322 may be indicative of a second wear state of coating system 314.

In some examples, the composition of first wear indicator 322 may be different than the composition of second wear indicator 332. As coating system 314 wears, e.g., at least to surface 333 of wear indicator 332, a first luminance (e.g., a first frequency of emitted radiation) emitted by second wear indicator 332 may be indicative of a first wear state of coating system 314. As coating system 314 wears further, e.g., at least to surface 323 of wear indicator 322, a second luminance (e.g., a second frequency of emitted radiation) emitted by first wear indicator 322 may be indicative of a second wear state of coating system 314.

Figure 5:
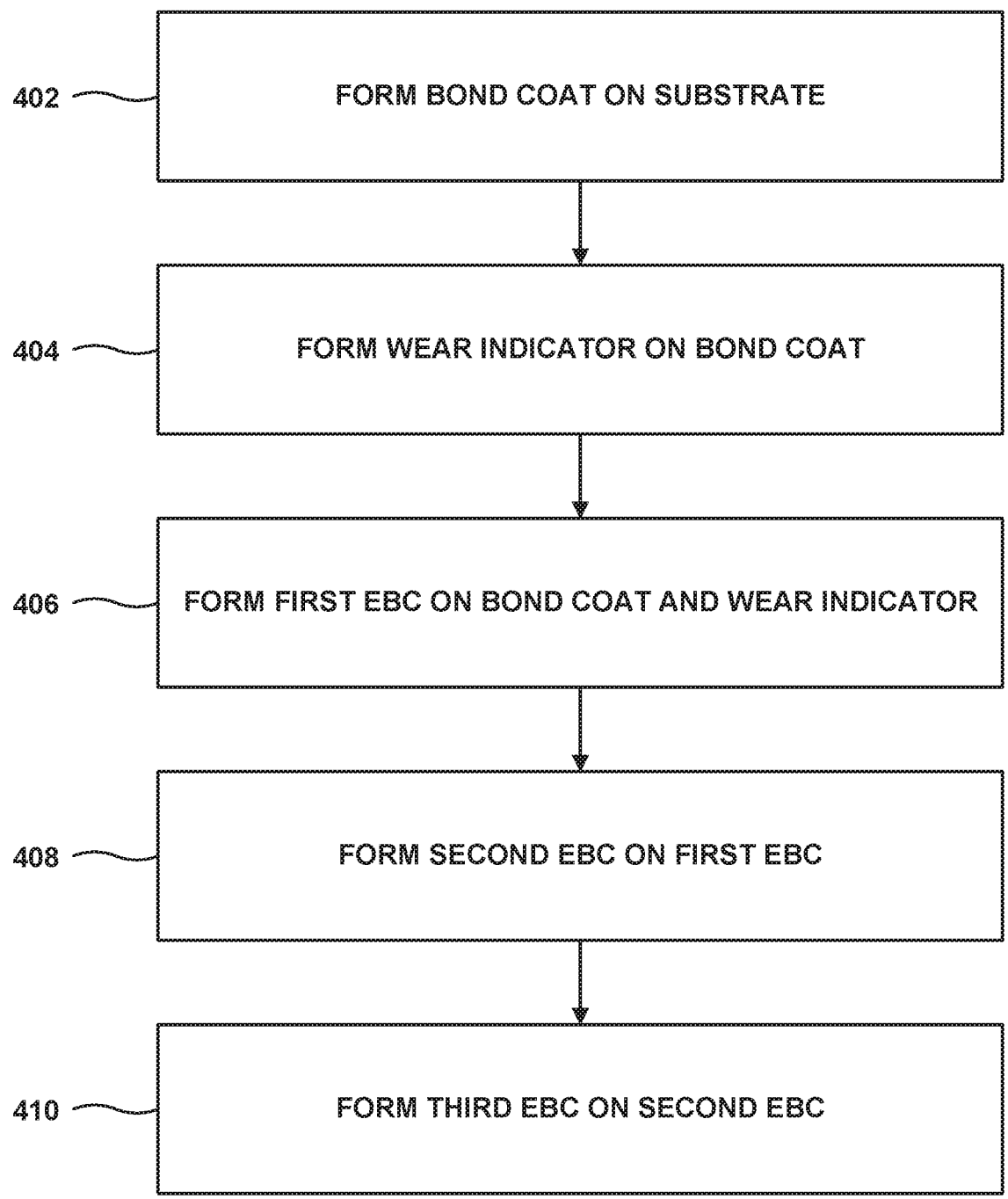
FIG. 5 is a flow diagram illustrating an example technique for forming an example coating system including a wear indicator.

The coating systems including wear indicators described herein may be formed using any suitable manufacturing technique, such as, for example, an additive manufacturing technique or one or more thermal spraying techniques. FIG. 5 is a flow diagram illustrating an example technique for forming an example coating system including a wear indicator. The technique illustrated in FIG. 5 will be described with respect to article 110 of FIG. 2. However, the technique illustrated in FIG. 5 may be used to form other articles, and article 110 may be formed using other techniques.

In some examples, the technique optionally includes forming bond coat 118 on substrate 112 (402). Bond coat 118 may be formed on surface 116 of substrate 112 using a thermal spray technique such as plasma spraying; PVD, such as EB-PVD or DVD; CVD; cathodic arc deposition; slurry deposition; sol-gel deposition; electrophoretic deposition; or the like. In some examples, article 110 may not include bond coat 118, and the technique may not include forming bond coat 118 on substrate 112 (402).

The technique includes forming, by an additive manufacturing technique, on bond coat 118, wear indicator 122 (404). The additive manufacturing technique may include, for example, three dimensional printing or thermal spraying. In some examples, forming wear indicator 122 may include, mixing a coating material and a chromophore dopant. In some examples, forming wear indicator 122 may include forming wear indicator 122 to define a selected shape, such as a rectilinear shape or a tapered column, as described above in reference to FIG. 1. In some examples, forming wear indicator 120 may include forming a second wear indicator (e.g., wear indicator 232) on bond coat 118. In some examples, rather than forming wear indicator 122 on bond coat 118, the technique may include forming wear indicator 122 on a portion of first EBC 120, such as a first layer of multiple layers deposited to define first EBC 120.

The technique includes forming first EBC 120 on optional bond coat 118 (or substrate 112 if bond coat 118 is not present) (406). First EBC 120 may be formed using, for example, a thermal spraying technique. In some examples, forming first EBC 120 may include substantially surrounding or covering wear indicator 122.

The technique optionally includes forming second EBC 128 on first EBC 120 (408). Second EBC 128 may be formed using a thermal spray technique such as plasma spraying; PVD, such as EB-PVD or DVD; CVD; cathodic arc deposition; slurry deposition; sol-gel deposition; electrophoretic deposition; or the like. In some examples, forming second EBC 128 may include forming second EBC 128 to include a coating material and a second chromophore dopant, as describe above in reference to FIG. 2. In some examples, forming second EBC 128 may include forming a second wear indicator (e.g., second wear indicator 333) on a surface of first EBC 120.

The technique optionally includes forming third EBC 130 on second EBC 128 (410). Third EBC 130 may be formed using a thermal spray technique such as plasma spraying; PVD, such as EB-PVD or DVD; CVD; cathodic arc deposition; slurry deposition; sol-gel deposition; electrophoretic deposition; or the like. In some examples, forming third EBC 130 may include forming third EBC 130 to include a coating material and a third chromophore dopant, as describe above in reference to FIG. 2. In some examples, forming third EBC 130 may include forming a third wear indicator on a surface of second EBC 128.

Figure 6:
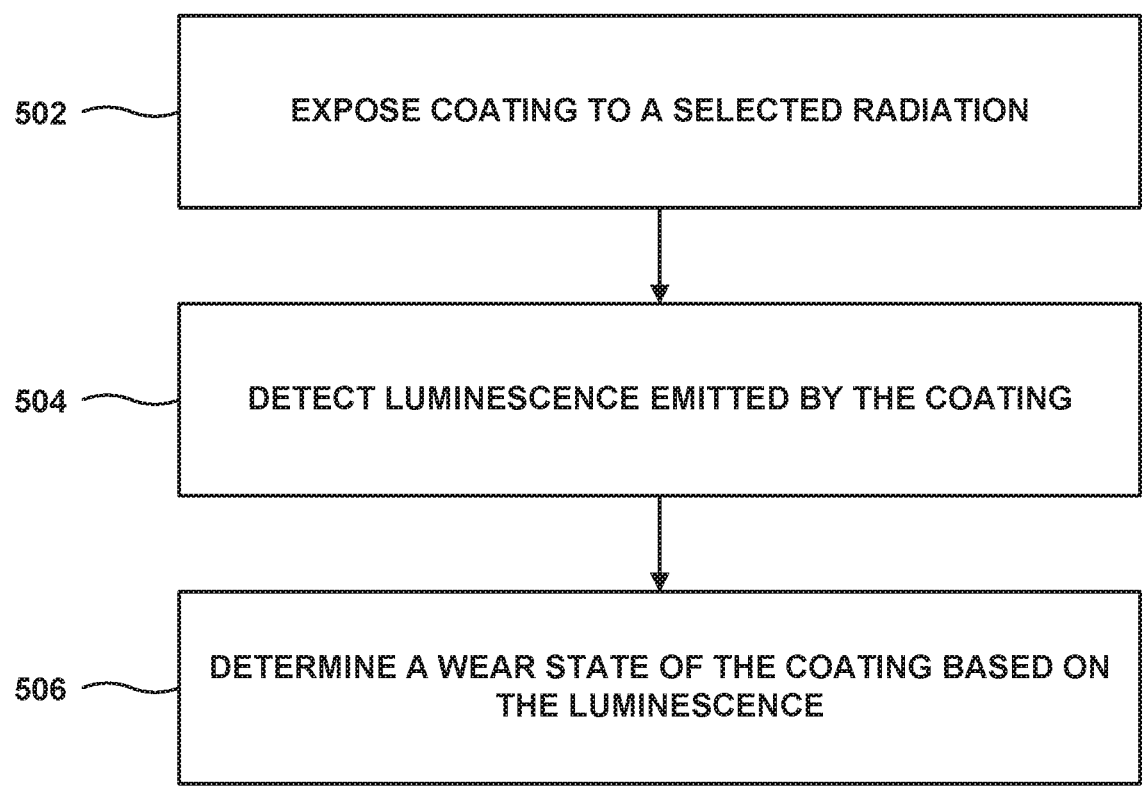
FIG. 6 is a flow diagram illustrating an example technique for determining a wear state of a coating system that includes a wear indicator.

The coating systems including wear indicators described herein may be used to determine a wear state of a coating system. FIG. 6 is a flow diagram illustrating an example technique for determining a wear state of a coating system that includes a wear indicator. The technique illustrated in FIG. 6 will be described with respect to article 110 of FIG. 2. However, the technique illustrated in FIG. 6 may be used to detect a wear state of other coating systems, and the wear state of coating system 114 may be detected using other techniques.

The technique includes exposing coating system 114 to a selected radiation (502). The selected radiation may include, for example, visible wavelengths, UV wavelengths, or both. In other examples, other wavelengths of radiation may be used. In some examples, exposing coating system 114 to a selected radiation may include using a LED or other radiation emitting device to direct radiation toward outer surface 126 of coating system 114.

The technique includes, after exposing coating system 114 to a selected radiation, detecting a luminescence emitted by coating system 114 (504). In some examples, detecting the luminescence may include using a spectrometer, or other device configured to detect radiation, to determine a frequency or frequency range of the luminescence. In some examples, detecting the luminescence may include using a spectrometer, or other device configured to detect radiation, to determine an intensity of the luminescence. In some examples, detecting the luminescence may include visually observing a color or other visual characteristic of the luminescence.

The technique includes, after detecting the luminescence, determining a wear state of coating system 114 based on the detected luminescence (506). For example, a frequency, an intensity, or a visual characteristic of the luminescence may correspond to wear state of coating system 114. In some examples, determining the wear state may include, determining, by processing circuitry, based on a signal received from a device configured to detect a frequency and/or an intensity of the luminescence and a lookup table including data relating frequency and/or intensity to a corresponding wear state, the wear state of coating system 114.

The following clause illustrate example subject matter described herein:

Clause 1. An article comprising: a substrate defining a surface; a bond coat on the surface of the substrate; a coating layer comprising at least one of an environmental barrier coating (EBC) or an abradable coating; and a chromophore dopant disposed in a first region of the coating layer and defining a wear indicator configured to indicate wear of the coating layer, wherein the wear indicator comprises: a material of the EBC or the abradable coating; and the chromophore dopant.

Clause 2. The article of clause 1, wherein the wear indicator is disposed on the bond coat.

Clause 3. The article of clause 1 or 2, wherein the wear indicator defines a rectilinear column extending substantially perpendicular to the surface of the substrate.

Clause 4. The article of any one of clauses 1 through 3, wherein the chromophore dopant emits a selected luminescence in response to a selected incident radiation.

Clause 5. The article of clause 4, wherein the selected incident radiation comprises at least one of visible light or ultra-violet light.

Clause 6. The article of any one of clauses 1 through 5, wherein at least a portion of the wear indicator defines a tapered column extending substantially perpendicular to the surface of the substrate, wherein the shape of the tapered column of the wear indicator is configured to, in a first wear state, emit a first luminescence in response to a selected incident radiation and, in a second wear state, emit a second, different luminescence in response to the selected incident radiation.

Clause 7. The article of any one of clauses 1 through 6, wherein the chromophore dopant comprises a trivalent rare earth chromophore.

Clause 8. The article of any one of clauses 1 through 7, wherein the chromophore dopant comprises at least one of $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, or $Yb^{3+}$.

Clause 9. The article of any one of clauses 1 through 8, wherein the chromophore dopant comprises a rare earth chromophore (RE), wherein the chromophore dopant and the material of the EBC or the abradable coating is configured to form at least one of $RE_{1-x}SiO_5:RE^{3+}x$ or $RE_{1-x}Si_2O_7:RE^{3+}x$, wherein X is within a range from about 0.0005 to about 0.5.

Clause 10. The article of any one of clauses 1 through 9, wherein the chromophore dopant comprises a first chromophore dopant disposed in the first region of the coating layer, wherein the wear indicator comprises a first wear indicator, and wherein the article further comprises: a second chromophore dopant disposed in at least a second region of the coating layer defining a second wear indicator comprising: a material of the environmental barrier coating (EBC) or the abradable coating; and the second chromophore dopant, wherein the first wear indicator is configured to indicate a first wear state of the coating layer and the second wear indicator is configured to indicate a second wear state of the coating layer.

Clause 11. The article of any one of clauses 1 through 10, wherein the coating layer comprises a first coating layer, and wherein the article further comprises a second coating layer disposed on the first coating layer, wherein the second coating layer comprises: at least one of a second environmental barrier coating (EBC) or a second abradable coating; and a second chromophore dopant, wherein the chromophore dopant of the first coating layer is configured to indicate a first wear state of the article, wherein the second chromophore dopant is configured to indicate a second wear state of the article.

Clause 12. The article of clause 11, wherein the article further comprises a third coating layer disposed on the second coating layer, wherein the third coating layer comprises: at least one of a third environmental barrier coating (EBC) or a third abradable coating; and a third chromophore dopant, wherein the third chromophore dopant is configured to indicate a third wear state of the article.

Clause 13. A coating system of a gas turbine engine component comprising: a bond coat on a surface of a ceramic matrix composite defining the gas turbine engine component; and a coating layer on the bond coat, wherein the coating layer comprises at least one of an environmental barrier coating (EBC) or an abradable coating; and a chromophore dopant disposed in a first region of the coating layer and defining a wear indicator configured to indicate wear of the coating layer, wherein the wear indicator comprises: a material of the EBC or the abradable coating; and the chromophore dopant.

Clause 14. The coating system of clause 13, wherein at least one of the coating layer comprises the coating layer of any one of clauses 2 through 12 or the wear indicator comprises the wear indicator of any one of clauses 2 through 12.

Clause 15. A method comprising: depositing a bond coat on a surface of a substrate; depositing a wear indicator on the bond coat, wherein the wear indicator comprises: a material of at least one of an EBC or an abradable coating; and a chromophore dopant; and depositing on at least a portion of the bond coat and the wear indicator a coating layer comprising the material of the EBC or the abradable coating.

Clause 16. The method of clause 15, wherein the coating layer comprises a first coating layer, and wherein the method further comprise depositing on the first coating layer a second coating layer comprising at least one of a second EBC or a second abradable coating.

Clause 17. The method of clause 16 wherein the second coating layer comprises a second, different chromophore dopant, wherein the chromophore dopant of the first coating layer is configured to indicate a first wear state of the article, and wherein the second chromophore dopant is configured to indicate a second wear state of the article.

Clause 18. The method of any one of clauses 15 through 17, wherein the wear indicator comprises a first wear indicator, wherein the method further comprises depositing on at least one of the bond coat or the first coating layer a second wear indicator comprising: a second material of at least one of a second EBC or a second abradable coating; and a second chromophore dopant, and wherein the first wear indicator is configured to indicate a first wear state of the coating layer and the second wear indicator is configured to indicate a second wear state of the coating layer.

Clause 19. The method of any one of clauses 15 through 18, wherein at least one of the coating layer comprises the coating layer of any one of clauses 2 through 12 or the wear indicator comprises the wear indicator of any one of clauses 2 through 12.

Various examples have been described. These and other examples are within the scope of the following claims.

The invention claimed is:

1. An article comprising:
   a substrate defining a surface;
   a bond coat on the surface of the substrate;
   a coating layer comprising at least one of an environmental barrier coating (EBC) or an abradable coating; and
   a chromophore dopant disposed in the coating layer and defining a columnar wear indicator configured to indicate wear of the coating layer, wherein the wear indicator comprises:
      a material of the EBC or the abradable coating; and
      the chromophore dopant, wherein the chromophore dopant comprises a trivalent rare earth chromophore (RE), wherein the chromophore dopant and the material of the EBC or the abradable coating is configured to form at least one of $RE_{1-x}SiO_5:RE^{3+}x$ or $RE_{1-x}Si_2O_7:RE^{3+}x$, wherein X is within a range from about 0.0005 to about 0.5.

2. The article of claim 1, wherein the wear indicator is disposed on the bond coat.

3. The article of claim 1, wherein the wear indicator defines a rectilinear column extending perpendicular to the surface of the substrate.

4. The article of claim 1, wherein the chromophore dopant emits a selected luminescence in response to a selected incident radiation.

5. The article of claim 4, wherein the selected incident radiation comprises at least one of visible light or ultraviolet light.

6. The article of claim 1, wherein at least a portion of the wear indicator defines a tapered column extending perpendicular to the surface of the substrate, wherein the shape of the tapered column of the wear indicator is configured to, in a first wear state, emit a first luminescence in response to a selected incident radiation and, in a second wear state, emit a second, different luminescence in response to the selected incident radiation.

7. The article of claim 1, wherein the chromophore dopant comprises a trivalent rare earth chromophore.

8. The article of claim 1, wherein the chromophore dopant comprises at least one of $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, or $Yb^{3+}$.

9. The article of claim 1, wherein the chromophore dopant comprises a first chromophore dopant disposed in a first region of the coating layer, wherein the wear indicator comprises a first wear indicator, and wherein the article further comprises:
  a second chromophore dopant disposed in at least a second region of the coating layer defining a second wear indicator comprising:
    a material of the environmental barrier coating (EBC) or the abradable coating; and
    the second chromophore dopant,
  wherein the first wear indicator is configured to indicate a first wear state of the coating layer and the second wear indicator is configured to indicate a second wear state of the coating layer.

10. The article of claim 1, wherein the coating layer comprises a first coating layer, and wherein the article further comprises a second coating layer disposed on the first coating layer, wherein the second coating layer comprises:
  at least one of a second environmental barrier coating (EBC) or a second abradable coating; and
  a second chromophore dopant,
  wherein the chromophore dopant of the first coating layer is configured to indicate a first wear state of the article, wherein the second chromophore dopant is configured to indicate a second wear state of the article.

11. The article of claim 10, wherein the article further comprises a third coating layer disposed on the second coating layer, wherein the third coating layer comprises:
  at least one of a third environmental barrier coating (EBC) or a third abradable coating; and
  a third chromophore dopant,
  wherein the third chromophore dopant is configured to indicate a third wear state of the article.

12. A coating system of a gas turbine engine component comprising:
  a bond coat on a surface of a ceramic matrix composite defining the gas turbine engine component; and
  a coating layer on the bond coat, wherein the coating layer comprises at least one of an environmental barrier coating (EBC) or an abradable coating; and
  a chromophore dopant disposed in the coating layer and defining a columnar wear indicator configured to indicate wear of the coating layer, wherein the wear indicator comprises:
    a material of the EBC or the abradable coating; and
    the chromophore dopant, wherein the chromophore dopant comprises a trivalent rare earth chromophore (RE), wherein the chromophore dopant and the material of the EBC or the abradable coating is configured to form at least one of $RE_{1-x}SiO_5:RE^{3+}x$ or $RE_{1-x}Si_2O_7:RE^{3+}x$, wherein X is within a range from about 0.0005 to about 0.5.

13. The coating system of claim 12, wherein the wear indicator defines a rectilinear column extending perpendicular to the surface of the substrate or a tapered column extending perpendicular to the surface of the substrate, wherein the shape of the tapered column of the wear indicator is configured to, in a first wear state, emit a first luminescence in response to a selected incident radiation and, in a second wear state, emit a second, different luminescence in response to the selected incident radiation.

14. The coating system of claim 12, wherein the chromophore dopant emits a selected luminescence in response to least one of visible light or ultra-violet light.

15. The coating system of claim 12, wherein the chromophore dopant comprises at least one of $Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, or $Yb^{3+}$.

16. A method comprising:
  depositing a bond coat on a surface of a substrate;
  depositing a columnar wear indicator on the bond coat, wherein the wear indicator comprises:
    a material of at least one of an EBC or an abradable coating; and
    a chromophore dopant, wherein the chromophore dopant comprises a trivalent rare earth chromophore (RE), wherein the chromophore dopant and the material of the EBC or the abradable coating is configured to form at least one of $RE_{1-x}SiO_5:RE^{3+}x$ or $RE_{1-x}Si_2O_7:RE^{3+}x$, wherein X is within a range from about 0.0005 to about 0.5; and
  depositing on at least a portion of the bond coat and the wear indicator a coating layer comprising the material of the EBC or the abradable coating.

17. The method of claim 16, wherein the coating layer comprises a first coating layer, and wherein the method further comprise depositing on the first coating layer a second coating layer comprising at least one of a second EBC or a second abradable coating.

18. The method of claim 17 wherein the second coating layer comprises a second, different chromophore dopant, wherein the chromophore dopant of the first coating layer is configured to indicate a first wear state of the article, and wherein the second chromophore dopant is configured to indicate a second wear state of the article.

19. The method of claim 16, wherein the wear indicator comprises a first wear indicator, wherein the method further comprises depositing on at least one of the bond coat or the first coating layer a second wear indicator comprising:
  a second material of at least one of a second EBC or a second abradable coating; and
  a second chromophore dopant, and
  wherein the first wear indicator is configured to indicate a first wear state of the coating layer and the second wear indicator is configured to indicate a second wear state of the coating layer.

* * * * *

UNITED STATES PATENT AND TRADEMARK OFFICE
CERTIFICATE OF CORRECTION

PATENT NO. : 11,326,469 B2
APPLICATION NO. : 16/887294
DATED : May 10, 2022
INVENTOR(S) : Li Li and Jun Shi Page 1 of 1

It is certified that error appears in the above-identified patent and that said Letters Patent is hereby corrected as shown below:

In the Claims

Column 16, Line 25 (Claim 15): replace "$Ce^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, or $Yb^{3+}$" with --$Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, or $Yb^{3+}$--

Signed and Sealed this
Seventh Day of November, 2023

Katherine Kelly Vidal
*Director of the United States Patent and Trademark Office*